UNITED STATES PATENT OFFICE.

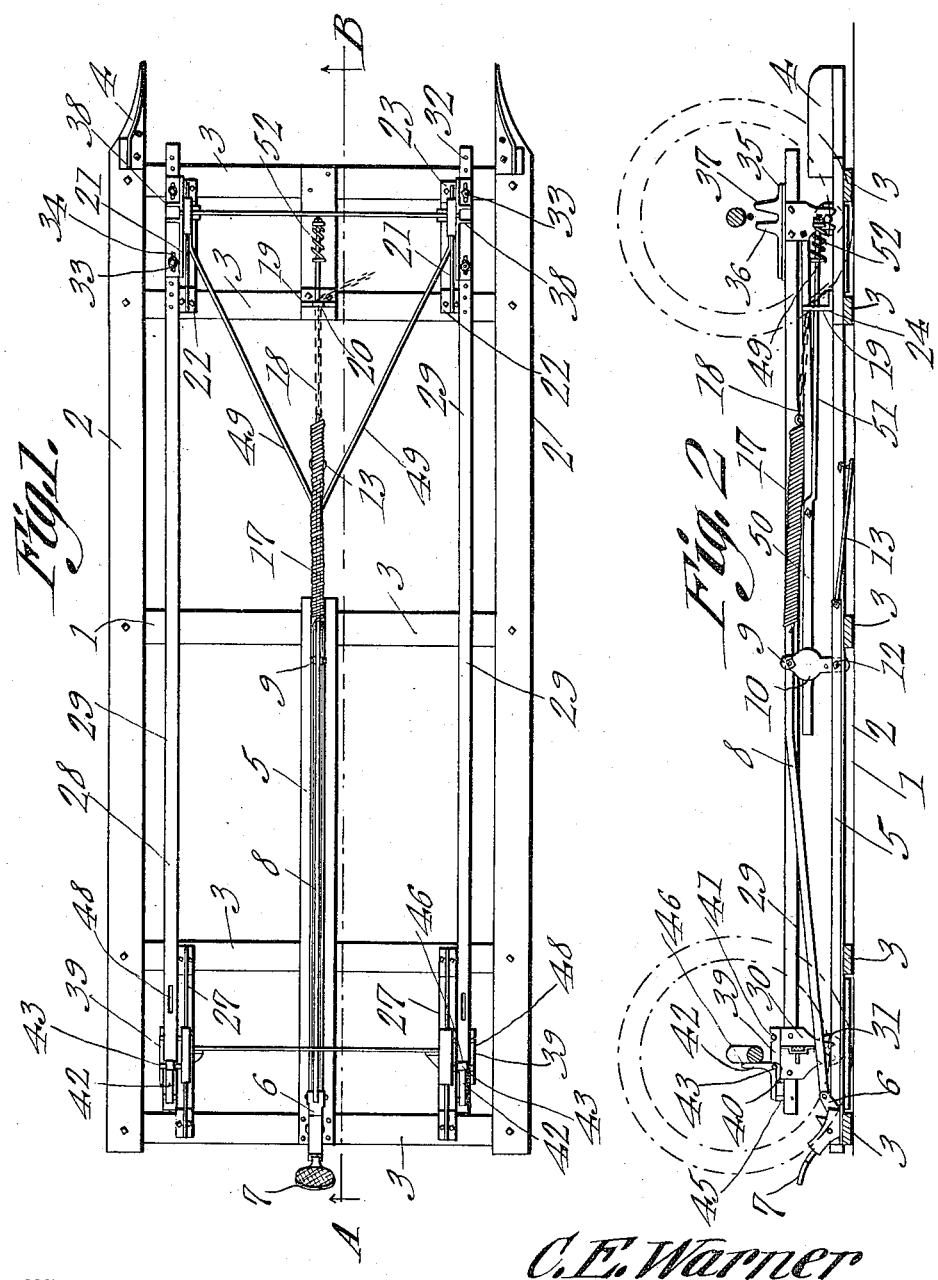

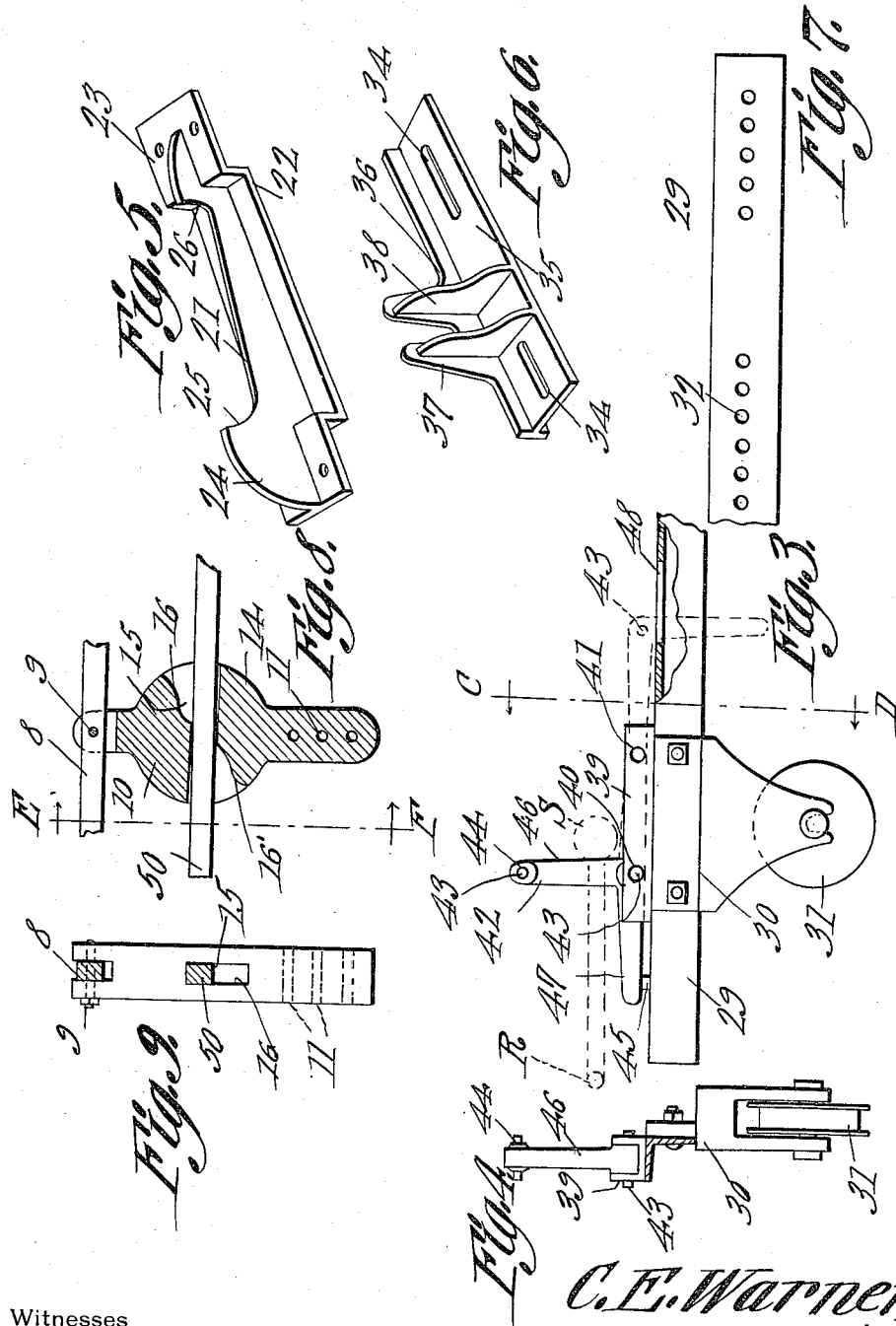

CHARLES E. WARNER, OF OTTAWA, KANSAS.

VEHICLE-JACK.

1,158,754.   Specification of Letters Patent.   Patented Nov. 2, 1915.

Application filed December 18, 1913. Serial No. 807,530.

*To all whom it may concern:*

Be it known that I, CHARLES E. WARNER, a citizen of the United States, residing at Ottawa, in the county of Franklin and State of Kansas, have invented a new and useful Vehicle-Jack, of which the following is a specification.

This invention relates to vehicle jacks of that type having means whereby the movement of a vehicle onto the jack operates the structure to lift the vehicle and support it with its wheels out of contact with the ground.

One of the objects of the invention is to provide a vehicle jack of this type which is adjustable to vehicles of different lengths; and which has novel means for automatically locking the jack when raised any distance out of its normal position, said means being readily released to permit gravitation of the jack to its initial position.

A further object is to provide a jack of this type having abutment members adapted to be engaged by the axle of the vehicle so as to shift the jack to its elevated or vehicle supporting position, the said abutment permitting the passage thereover of any part which may be supported in front of and in the same plane with the front axle, but being so arranged as to automatically assume a position in front of the axle, thus to be engaged thereby.

A further object is to provide an abutment member which can be shifted out of active position to allow a vehicle to pass entirely over the jack without causing the actuation thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the jack. Fig. 2 is a section on line A—B Fig. 1. Fig. 3 is an enlarged side elevation of the front portion of the truck member of the jack, different positions of the abutment member being indicated by full and dotted lines. Fig. 4 is a vertical transverse section through one side portion of the truck member, said section being taken on the line C—D Fig. 3. Fig. 5 is a perspective view of one of the inclined rails. Fig. 6 is a perspective view of one of the rear axle supporting brackets. Fig. 7 is a plan view of a portion of the base on which the bracket shown in Fig. 6 is adapted to be mounted. Fig. 8 is a section through the clutch used for securing the truck member in elevated position. Fig. 9 is a section on line E—F Fig. 8.

Referring to the figures by characters of reference 1 designates a base frame made up of side strips 2 and end and intermediate cross strips 3, the side strips being preferably extended beyond one of the end cross strips and provided with deflecting plates 4 upstanding therefrom and converging toward the free ends thereof. Parallel angle strips 5 are secured upon the middle portions of one of the end strips and certain of the intermediate strips 3 of the frame 1 and pivotally mounted between the outer end portions of these angle strips 5 is a bell crank lever 6 one end of which carries a foot plate 7 while the other end is pivotally connected to an actuating bar 8 extending above the angle strips 5 and pivotally connected, as at 9, to the upper end portion of a clutch member 10 which is pivotally mounted at its lower end between the rear end portions of the angle strips 5. This clutch member 10 is preferably formed with a series of apertures 11 any one of which is adapted to receive the pivot bolt 12. Thus it will be seen that the clutch member can be adjusted vertically relative to the frame 1. An anchoring rod 13 is secured to the rear end portions of the angle strips 5 and may be attached in any suitable manner to the floor or other surface on which the jack may be mounted.

The clutch member 10 has an enlarged portion 14 through which extends a diametrical passage 15, the rear portion of the upper wall of the passage being cut away as shown at 16 while the front portion of the lower wall of the passage is cut away as shown at 16'. The straight active portions of the upper and lower walls of the passage 15 extend slightly past the longitudinal center of the clutch member 10 so as thus to form gripping jaws as will be hereinafter described.

A coiled spring 17 is connected to the rear end portion of the bar 8 and is furthermore connected in any suitable manner, as by means of a chain 18 or the like, to a bracket 19 upstanding from one of the cross strips 3. The upper end of this bracket is preferably forked so that the chain 18 can be connected adjustably to it and can be readily removed when desired. This fork has been indicated at 20. From the foregoing it will be seen that the spring 17 acts normally to hold the clutch member 10 swung backwardly away from the bell crank lever 6 and also to hold the foot plate 7 normally elevated.

Mounted upon the rearmost cross strip 3 are preferably two inclined rails one of which has been illustrated in detail in Fig. 5. As shown, the inclined rail 21 is in the form of an elongated web upstanding from an angular base plate 22 the end portions of which are offset upwardly as shown at 23 so as to rest upon said cross strips 3 while the intermediate portion of the base plate will project downwardly between and abut against the said cross strips. Each end of the rail 21 is formed with an upwardly extending enlargement 24 so that an upper shoulder 25 and a lower shoulder 26 is thus provided at each end of the active portion of the rail. These rails are adapted to be secured to the cross strips 3 in any suitable manner.

Mounted upon the two front cross strips 3 are rails 27 which are similar in all respects to the rail 21 hereinbefore described, these rails 27 being preferably disposed in alinement with the corresponding rails 21.

The truck member of the jack has been designated generally at 28 and includes side strips 29 to the ends of which are secured castings 30 which are preferably forked and are supported by wheels 31 which, as shown in Fig. 4, are provided with peripheral grooves so as to straddle the respective rails 21 and 27. Obviously these wheels all normally bear rearwardly against the lower shoulders 26 on the rails.

That portion of each side strip 29 located adjacent the rear castings 30, is formed with a series of apertures 32. Any of these apertures are adapted to receive bolts 33 insertible through longitudinal slots 34 formed in the bases 35 of a rear axle engaging member 36. Each of these members has an upwardly extending forked ear 37 and may be provided with reinforcing webs 38.

Obviously by providing the slots 34 and the series of apertures 32, a very minute longitudinal adjustment of each axle engaging member can be effected.

Secured upon each side strip 29 adjacent the front casting 30 is a channeled base 39, the walls of which are formed with front and rear pairs of openings 40 and 41 respectively. A rectangular abutment member 42, in the form of a bell crank, is provided at its angle portions, with a removable pin 43 and at one end portion with an opening 44 to receive said pin. A supporting stud 45 extends upwardly from the member 29 and in front of the base 39. The arm 46 of the abutment member 42 and in which is formed the opening 44, is adapted either to extend perpendicularly from the base 39, as shown by full lines in Figs. 3 and 4, or to lie within the channel members with pin 43 resting within the openings 40. When in this position the other arm, 47 of the abutment member will be extended perpendicularly. Another position of the abutment member has been indicated by dotted lines in Fig. 3 wherein the pin 43 is inserted in openings 41 and 44, while the arm 46 is extended substantially horizontally in a rearward direction from the base and the arm 47 is extended downwardly through a slot or the like formed in the side strip 29, as shown at 48.

The supporting ears 37 and the notches or recesses 40 are so positioned relative to each other that when the arm 46 of each abutment is extended vertically, as shown by full lines in Fig. 3, the distance between the rear edge of the abutment and a vertical plane extending through the centers of the ears 37 will be equal to the distance between the front and rear axles of the vehicle to be elevated. By reason of the adjustability of the rear axle supporting ears 37, hereinbefore described, it will be apparent that the parts can be arranged for use with vehicles of different lengths.

Pivotally connected to the rear castings 30 are connecting strips 49 converging forwardly and secured to the sides of a latch bar 50 which extends through the passage 15 in the clutch member 10. This latch bar has a rearward extension 51 which is slidably mounted in the bracket 19 and is provided, upon its rear portion, with a spring cushion 52. The distance between this cushion and the bracket 19 is somewhat less than the length of the active portions of the rails 21 and 27 so that, before the wheels 31 can come into contact with the upper shoulders 25 on the rails, the cushions 52 will be brought into play, thus preventing the wheels 31 from striking the shoulders 25 with undue force.

When it is desired to use the jack, the same is first adjusted so that the distance between the ears 37 and the upstanding arms 46 will be substantially equal to the distance beyond the front and rear axles. Assuming that the wheels 31 are bearing rearwardly against the shoulders 26, the vehicle to be raised and which can be an automobile or the like, is driven longitudinally of the jack so as to straddle the same, the deflecting plates 4 serving to properly guide the jack into position between the wheels, if necessary. As the machine moves forward the front axle will come into contact with the arms 46, the normal positions of which have been indicated by full lines in Fig. 3 and, consequently, the entire structure will be moved forwardly and upwardly along the rails 21 and 27, thus causing the latch bar 50 to slide forwardly within the clutch member 10. The impact of the front axle against the arms 46 will be sufficient to lift the machine bodily from the ground and as soon as the movement of the truck in a forward direction stops, the clutch member 10 will swing about its pivot 12 so that the jaws formed by the upper and lower walls of the passage 15 will grip upon the bar 50 and prevent it from moving back to its initial position. Consequently the truck will be held in its elevated position on the inclined rails 21 and 27 and the wheels of the vehicle will thus be supported out of contact with the ground. By pressing downwardly on the foot plate 7, the clutch member 10 can be drawn forwardly at its upper end so as to release the bar 50 and permit it to slide rearwardly, thus permitting the truck member to gravitate to its initial position.

In some makes of automobiles there is a cross rod supported in front of the front axle and, consequently, should the abutment members 42 be positioned as shown in Fig. 3, this cross rod would come against the arm 46 in advance of the axle so that the jack would not operate properly. To overcome this objection it is merely necessary, before driving the machine onto the jack, to adjust the abutment members 42 so that the arms 46 will rest within the channeled bases 39 while the arms 47 are extended vertically. By then driving the vehicle onto the jack, the cross rod mentioned and which has been indicated by dotted lines at R will strike the arms 47 of the abutments and cause said abutments to swing to the positions shown by full lines in Fig. 3, said arms 47 dropping onto the studs 45 while the arms 46 are brought upwardly into position in front of the axle indicated by dotted lines at S. Thus the machine will operate as before described.
Should it be desired to drive the vehicle over the jack without actuating said jack, it would merely be necessary to place the abutment members in the position indicated by dotted lines in Fig. 3, wherein the arms 47 are extended downwardly through the slots 48. Thus no part of the jack would extend into the path of the axles.

By providing the slots in the axle engaging ears 37, a truss rod such as shown at T in Fig. 2 and which is sometimes provided under the rear axle of a vehicle, can become seated within the slots without interfering with the engagement of the axle by the ears.

What is claimed is:—

1. A vehicle jack including a base having inclined rails, a truck movable upon the rails and having vehicle engaging portions carried thereby, a clutch member, a member slidably mounted therein, and yielding means for holding the clutch member in engagement with the slidable member to hold said slidable member against movement in one direction, one of said members being connected to the base and the other member being connected to the truck.

2. A vehicle jack including a truck, means for elevating the truck when moved longitudinally in one direction by a vehicle to be lifted, means upon the truck for engagement by the vehicle to shift the truck, said means including diverging arms tiltably mounted at their merging ends, and means for limiting said tilting action in one direction.

3. In a vehicle jack, an abutment for engagement by an axle of a vehicle, including a base, arms disposed at angles to each other, and a pivot pin removably mounted in either end portion of one of the arms, said arms being tiltable relative to the base to position either of them in upstanding or active position.

4. In a vehicle jack, an abutment for engagement by an axle of a vehicle, including a base, arms disposed at angles to each other, and a pivot pin removably mounted in either end portion of one of the arms, said arms being tiltable relative to the base to position either of them in upstanding or active position or with both of them out of active positions.

5. In a vehicle jack, an abutment for one of the axles of the vehicles, including base having openings, an arm tiltable relative to the base and having a pivot pin removably mounted in either of the ends thereof adapted to be seated in either or both of the openings, and another arm extending from one end of the first named arm and movable therewith.

6. A vehicle jack including a truck, means for elevating the same under the action of a vehicle brought to position above the truck, and means for transmitting motion from the vehicle to the truck, said means including a base, an abutment arm adapted to be supported out of active position upon the base, and means extending from and movable with the abutment arm and adapted to be engaged by a rod in advance of the axle of the vehicle to position the abutment arm in the path of said axle.

7. A vehicle jack including a truck member, means for elevating the same when subjected to the forward action of the vehicle to be raised, and means for transmitting motion from said axle to the truck, said means including a base, an abutment arm tiltably connected thereto and adapted to lie upon the base and below the path of the axle, and an arm extending from the abutment arm for engagement by a portion of the vehicle in front of the axle to elevate the abutment arm into the path of the axle, said abutment arm and the arm extending therefrom being tiltable downwardly out of active position.

8. In a vehicle jack, the combination with a base, of inclined rails thereon having stop shoulders at the ends thereof, a truck, supporting wheels connected to the truck and mounted on the rails, said wheels normally bearing against the shoulders at the lower ends of the rails, a tiltable clutch member connected to the base, a latch bar slidably mounted therein, yielding means for normally binding the clutch member upon the latch bar to hold the truck against movement downwardly along the rails, said latch bar being slidable in the clutch member to permit movement of the truck upwardly along the rails, and coöperating means upon the truck and base for gradually retarding the upward movement of the truck when brought near the upper ends of the rails.

9. In a vehicle jack, the combination with a base, of inclined rails thereon having stop shoulders at the ends thereof, a truck, supporting wheels connected to the truck and mounted on the rails, said wheels normally bearing against the shoulders at the lower ends of the rails, a tiltable clutch member connected to the base, a latch bar slidably mounted therein, yielding means for normally binding the clutch member upon the latch bar to hold the truck against movement downwardly along the rails, said latch bar being slidable in the clutch member to permit movement of the truck upwardly along the rails, and means for shifting the clutch member to release the latch bar.

In testimony that I claim the foregoing as my own, I have hereto affixed my signature in the presence of two witnesses.

CHARLES E. WARNER.

Witnesses:
E. L. WARNER,
H. C. OVERMAN.

Copies of this patent may be obtained for five cents each, by addressing the "Commissioner of Patents, Washington, D. C."